Sept. 20, 1960 — F. L. SANNA — 2,953,457
METHOD FOR DRYING FOOD MATERIALS
Filed June 24, 1957 — 2 Sheets-Sheet 1
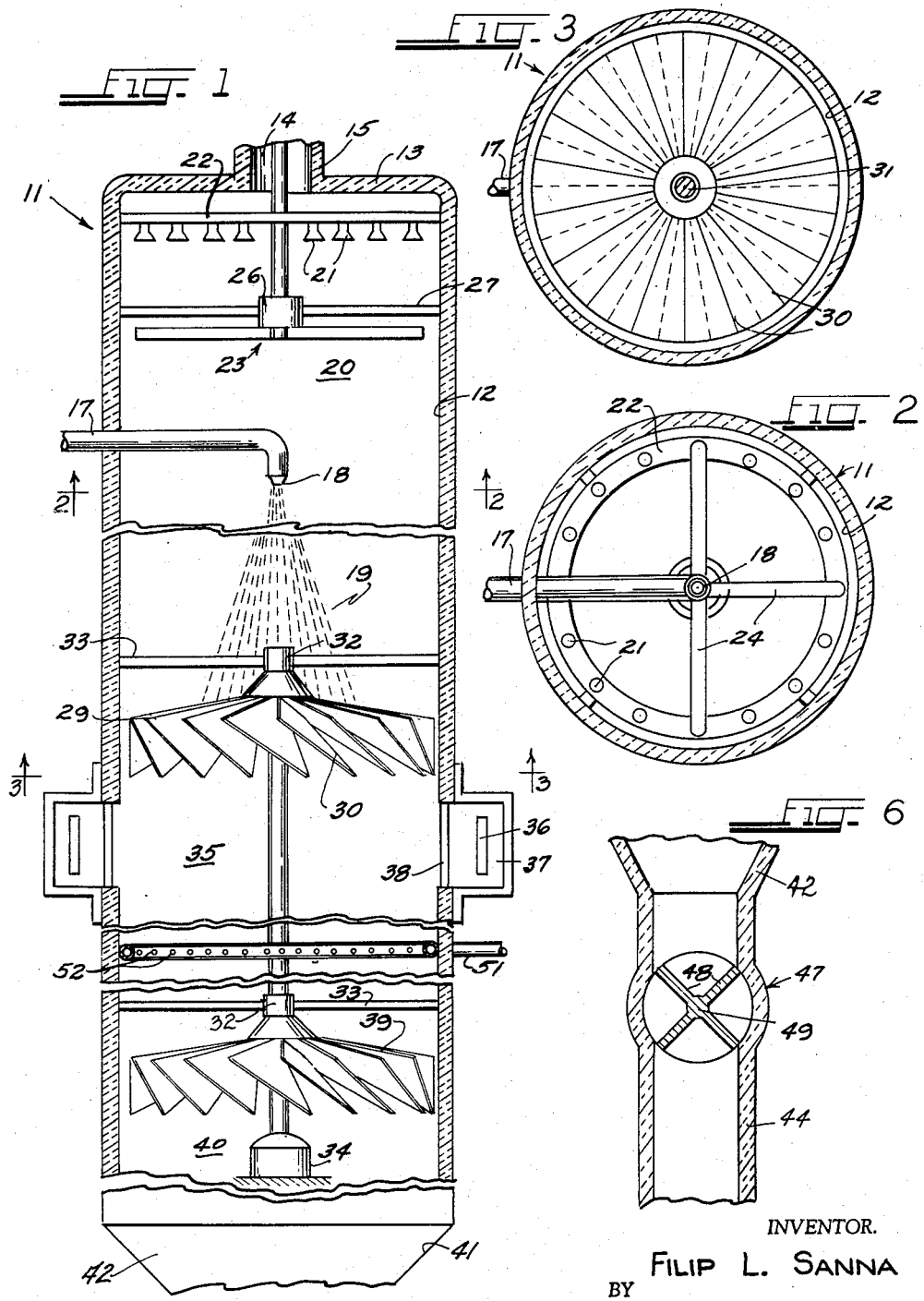
INVENTOR.
FILIP L. SANNA
BY Kegan and Kegan
Attys.

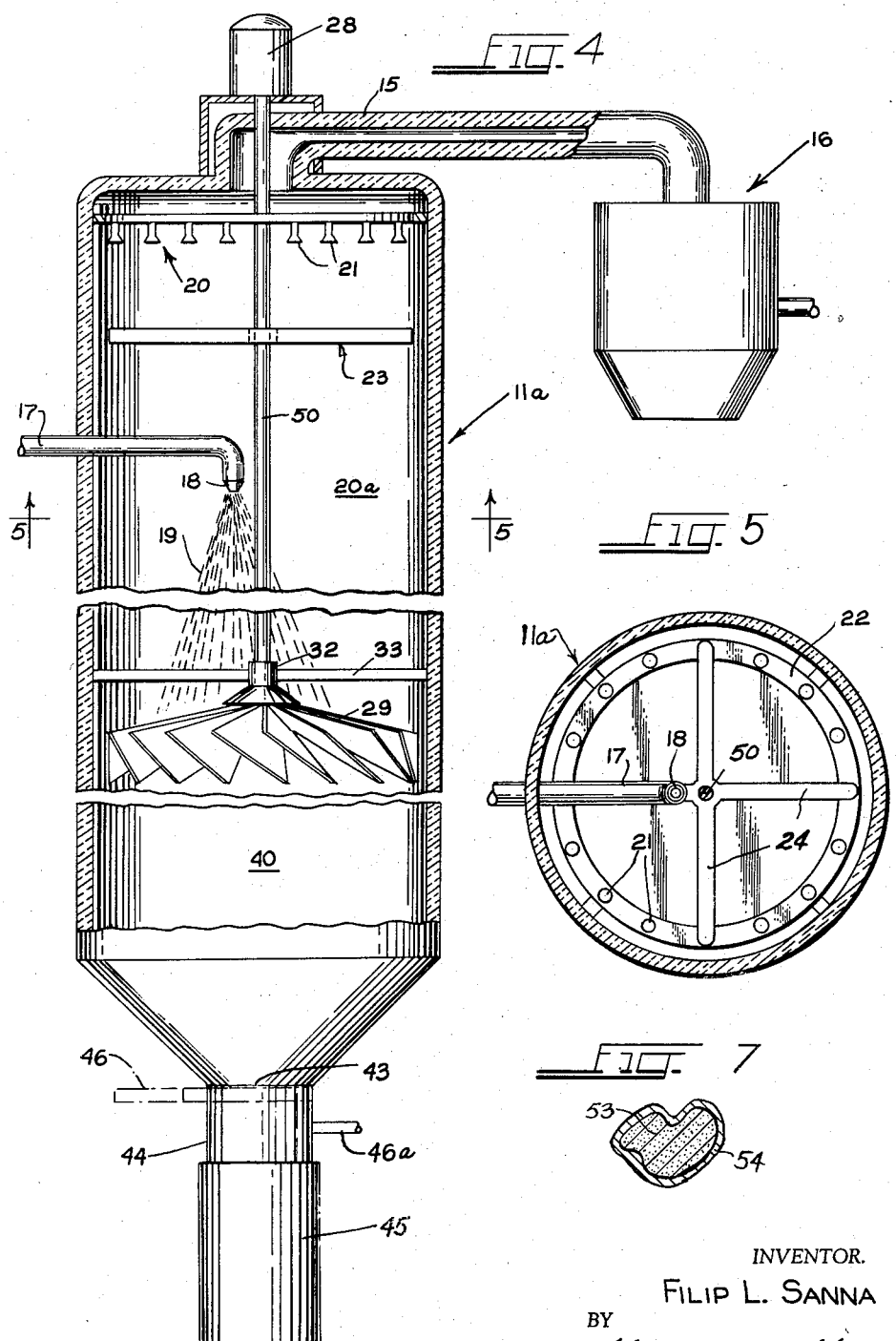

United States Patent Office 2,953,457
Patented Sept. 20, 1960

2,953,457

METHOD FOR DRYING FOOD MATERIALS

Filip Leon Sanna, Madison, Wis., assignor to Sanna Dairies, Inc., Madison, Wis., a corporation of Wisconsin Filed June 24, 1957, Ser. No. 667,612

4 Claims. (Cl. 99—56)

This invention relates to apparatus and processes for the removal of volatile material from systems also containing non-volatile material, as exemplified by the removal of water from milk, foodstuffs, biological fluids, and the like; and to processes and apparatus for dehydrating such fluids, wherein the heat input to the fluid is separately controlled at the various stages of the process, and balanced against the evaporative cooling effects so that the temperature for each moisture content of the material under treatment is closely controlled from beginning to end of the operation. Thus the instantaneous temperature of any particle of the fluid can be controlled to be any desired function of the instantaneous moisture content thereof. Hence the temperature and the moisture content of each particle can be made to conform to any preselected dehydration curve.

More particularly, the invention relates to a novel process, and apparatus therefor, which introduces heat in any desired predetermined pattern to a continuous flow of finely divided free falling particles to control moisture removal therefrom without affecting particle appearance, flavor, aroma or other important characteristics such as vitamin content. The apparatus for effectuating this process includes a drying chamber means for spraying the particles thereinto; means for maintaining the chamber under subatmospheric pressure and for withdrawing moisture released therein; means for generating within said chamber radiant heating energy of one or more wave length bands, supplied in a predetermined pattern along the path of the falling particles so as to supply just the right amount of heat to each particle at each stage of its descent to obtain the maximum rate of dehydration obtainable without adversely affecting the properties of the final product; means within the chamber for confining each wave length band to a predetermined zone of action, said means so operating without materially impeding the downward flow of the particles; and means for removing the thus treated particles from the chamber.

The dehydration of fluid foodstuffs containing water has received much attention in recent years, and a wide variety of processes and apparatus have been developed in an effort to obtain satisfactory dehydrated food products. For example, a great deal of research has been devoted to milk drying because suitably dried milk has the same nutritional value as fresh milk, but can be stored for longer periods and costs the consumer substantially less than fresh milk.

A major portion of the dried whole milk which is currently available is produced in spray drying processes involving heating of falling particles by circulating hot air in the drying chamber. However, the product has not been acceptable to a majority of consumers, because it is difficult to completely reconstitute with water; and after reconstitution it has a pronounced cooked flavor and creates an unpleasant sensation of chalkiness in the mouth. These defects are apparently caused by overheating the particles during some stage of their dehydration.

Similar problems are involved in the drying of whole eggs, egg whites, and blood. In these cases, if overheating occurs, the albumin therein becomes insoluble.

Another disadvantage which accompanies many of the known methods for dehydration of foods is the scorching or well known "browning reaction" which is a source of off-taste in dried foods and causes brown discoloration of the food to occur as it stands for a time, even though it looked white or clear when manufactured.

The instant processes and apparatus make it possible to control the dehydration of foods, whereby for every moisture content of the food under treatment, the temperature of the food is tailored so as not to exceed that temperature which would produce undesirable effects.

It is an object of the instant invention to provide improved apparatus and methods for the removal of volatile material from systems also containing non-volatile material.

It is a further object of the instant invention to provide improved apparatus and methods for the dehydration of aqueous fluids, such as foods containing water.

It is a further object of the instant invention to provide methods and apparatus for the production of improved dehydrated food products which are easy to reconstitute in cold water, and which possess the natural flavor of the original material.

It is a further object to produce an improved dehydrated milk which is rapidly reconstituable, which tastes like fresh whole milk, and which has neither cooked taste nor chalkiness.

An important object of this invention is to provide a continuous process and apparatus for dehydrating foods whereby the food under treatment is subjected to zones of varying heating intensities in accordance with the moisture content of the food in each zone, the heat input to the food in any zone being such as to vaporize moisture while not raising the particle temperature above that which might produce undesirable effects.

Another important object of this invention is to provide apparatus for dehydrating fluids, including a chamber, spray means for continuously injecting fluid into said chamber in the form of finely divided droplets, electromagnetic wave generator means for heating the free falling droplets to vaporize the moisture therein, means for maintaining a vacuum in said chamber and withdrawing the vapor therefrom, and means for removing the dehydrated particles from the chamber.

A specific object of this invention is to provide dehydrating apparatus, including a chamber, means for spraying droplets so as to fall through said chamber, vertically spaced radiant heaters for generating heat within the falling droplets in proportion to the moisture content thereof from moment to moment, means within said chamber for confining the radiation from each radiant heater to a predetermined vertical zone in said chamber without materially interfering with the flow of the particles from zone to zone, means for withdrawing from said chamber the vapor released from said droplets, and means for removing the dehydrated particles from the chamber.

These and other objects of the instant invention will become more apparent from the following description and claims.

The heating of the droplets referred to herein is caused by their absorption of electromagnetic radiation. Typical well known examples of suitable sources of electromagnetic heat radiation include microwaves, which generally are of length less than about $10^{-4}$ cm., and infra-red waves.

In the processes involved, substantially all of the water is removed from the substance being treated. The drying involves two principal stages: a primary stage of evaporation at a constant rate, and a terminal period of evaporation at a decreasing rate. During the constant rate period, moisture escapes from the droplet at a rate governed by the amount of heat introduced into the droplet, and the temperature of the droplet depends upon the absolute pressure of its environment. During this period, rapid evaporation is possible without substantial rise in the temperature of the material being treated. In the instant process, large quantities of heat are applied during the first stage so that a major portion of the water is rapidly removed. During the terminal period of evaporation at a steadily decreasing rate, the rate of moisture removal depends upon the speed with which the remaining moisture moves through the partially dried particle of material. The dissipation of heat due to evaporation of water from the particle continually decreases; accordingly in the instant invention the thermal input is reduced so that the temperature of the particle does not become so high as to damage the material being dehydrated.

Improved dehydrated products are obtained when a major portion of the water content of the substantially freely falling droplets is rapidly removed by heating at an absolute pressure below about 100 mm. of mercury, and preferably below about 25 mm., and when the input of heating energy is reduced in accordance with a predetermined schedule during the terminal period in which the rate of evaporation decreases, so that the product is not heat damaged. Curves and equations are available for some substances, showing the maximum permissible temperature to which the substance may be heated at every stage of dehydration from the initial material to the final dry product. In other cases, these facts must be determined, for example, by preparing a series of samples of successively decreasing moisture content by vacuum dehydration of the frozen original substance, or by other procedure which involves no risk of heat damage, and thereafter ascertaining the maximum temperature to which each sample may be heated without damage to the desired qualities of the sample. The energy input at each vertical zone in my apparatus is then adjusted so that each falling particle is never overheated. Its temperature will vary from moment to moment as it falls through my apparatus, but at every instant its temperature will be appropriate to its moisture content at that instant. The moisture content of the particles at every level in the apparatus can be determined by collecting samples at each level and withdrawing and analyzing them. The energy input at each level may then be set to produce the temperature appropriate for the moisture content at that level. The energy inputs may also be determined empirically, as follows: The energy input is gradually increased at the highest vertical level until the product just becomes objectionable, then the energy input is reduced just enough to obtain a good product, and is set at this level. The same procedure is repeated downward in sequence, each heater assembly being adjusted after the one just above it and before the one just below it.

Apparatus suitable for effectuating my invention is disclosed in the drawings, wherein:

Figure 1 is a central vertical sectional view of one form of my drying apparatus, with the interior parts shown in front elevation;

Figure 2 is a view taken on line 2—2 of Figure 1;

Figure 3 is a view taken on line 3—3 of Figure 1;

Figure 4 is a view similar to Figure 1, showing a second form of my improved drying apparatus;

Figure 5 is a view taken on line 5—5 of Figure 4;

Figure 6 is a fragmentary, partly schematic view, mostly in central vertical section, of the discharge end of my apparatus, showing an alternative rotary valve arrangement for removing the product without breaking the vacuum; and Figure 7 is a central cross-sectional view of a coated particle produced by my invention.

One specific embodiment of my invention is illustrated in Figures 1–3 of the drawings, which show a treatment chamber 11 comprising a vertically standing, generally cylindrical structure which usually is between 30 and 100 feet in height and between 6 and 20 feet in diameter. The physical dimensions of course depend upon the material being dried. The chamber's interior walls 12 preferably are made of stainless steel. At the chamber top 13, a passage 14 is provided for connection through a pipe 15 to a condenser and a source of vacuum, such as a vacuum pump, all indicated at 16 (Figure 4). The condenser and vacuum pump have sufficient capacity to maintain the chamber temperature between 0° C. and 5° C. by evaporation from the material being dehydrated. Generally, the pressure maintained for drying fluids such as milk varies between 25 mm. Hg and 5 mm. Hg, depending upon the particular material being dried (such as concentrated skim milk or concentrated whole milk containing about 40% total solids), and the particle size and other properties desired in the final product. The fluid to be dried is introduced through a line 17 into chamber 11 by means of a nozzle 18 which atomizes the liquid and sprays the particles downwardly into the chamber, for example, in a conical pattern 19. Multi-nozzle arrangements may be employed, just so raw fluid is sprayed in droplets which fall freely through the chamber, preferably without striking the wall 12 of the chamber. The nozzles may operate under pressures up to about 3500 pounds per square inch in instances where particle size is not important and where high production rates are desired; although, a pressure of between 300 and 1000 pounds per square inch is more generally used. The spray should be formed below the vacuum passage 14, in order to minimize entrainment over into the vacuum system.

Electromagnetic wave energy, as in the microwave range, is introduced into the primary or upper heating zone 20 of the chamber by a plurality of magnetron tubes 21 arranged on an annular mounting 22. Uniform distribution of the waves throughout zone 20 is achieved by a rotating reflector 23 which includes a series of spaced interconnected blades 24 mounted on a rotatable shaft 25 held within a collar 26 which is connected to the chamber wall by struts 27 to provide rigidity. Shaft 25 is rotatably driven by a motor 28 mounted outside the chamber.

The radiant energy from the magnetron tubes 21 is confined within zone 20 by a shield 29 which includes a plurality of downwardly and outwardly inclined pitched blades 30 which are arranged in overlapping, vertically spaced relation with each other. The blades 30 overlap sufficiently to prevent substantial leakage of the microwaves through the shield they form; yet they are so spaced and skewed as not to substantially impede the fall therethrough of the drying droplets. Shield 29 is keyed to a rotatable shaft 31, held in position by a collar 32 and struts 33, and is driven by motor 34 suitably fixed within the chamber. Other arrangements may, of course, be provided to confine each set of microwaves to its proper zone without materially impeding the downward flow of the drying particles. For example, fixed overlapping deflector blades may be provided, equipped with vibrating means to throw off the particles and thus prevent their collection on the deflector.

Immediately below zone 20 a second zone 35 is provided in chamber 11 to subject the falling particles to radiant energy of a different heating intensity than that in zone 20. As illustrated, the second zone 35 may be equipped with a series of infra-red lamps 36 to provide the desired radiant energy for heating the falling particles. The lamps are preferably provided in an annular compartment 37 having an annular infra-red penetrable shield 38 at its inner face. The waves are contained within zone 35 at its lower end by a second reflector shield 39, keyed to shaft 31, and constructed like shield 29.

While only two zones, 20 and 35, have been illustrated, it is obvious that any number of such zones may be provided, and that each may be equipped with any source of radiant energy appropriate to the nature and moisture content of the particles falling through that particular zone. The bottom portion of chamber 11, however, is not ordinarily equipped with heating devices, but instead comprises a final cooling zone 40 wherein the falling particles attain their final temperature.

The chamber bottom 41 may advantageously be in the shape of a conical hopper 42 which at its lower end has an opening 43 (Fig. 4) leading to a particle discharge duct 44. Duct 44 leads to a removable bin 45 which is fitted to it by a suitable airtight lock arrangement, there being provided in duct 44 a horizontally movable airtight door 46. Normally door 46 is kept open to allow the particles to fall directly into bin 45. When bin 45 becomes full, door 46 is closed, thereby sealing the bin from chamber 11. An inert gas may then be introduced to the bin 45 through line 46a and the lower portion of duct 44, in order to break the vacuum therein. The full bin is then removed, after which an empty bin is attached to duct 44 and evacuated, and door 46 again is opened.

Figure 6 shows an alternative means for particle removal from chamber 11, including a rotary valve 47 having operating vanes 48 extending radially outward from a continuously rotatable shaft 49. The rotary vanes 48 are so arranged that at all times a vacuum is maintained in the chamber 11 while particles are continuously discharged therefrom.

In Figure 4, the chamber 11a has only one microwave heating zone 20a, while both the reflector 23 and the shield 29 are keyed to a common rotatable shaft 50. Such an arrangement may be advantageously employed when the material being dried has first been subjected to a pre-drying treatment, so that only the last stage of the dehydration takes place in my apparatus.

The method and apparatus described herein are operative to remove volatile constituents incorporated with nonvolatile components, and are particularly adapted to dry aqueous fluids such as blood, as well as foodstuffs such as, but not limited to, milk, skim milk, buttermilk, cream, whey, egg whites, and whole eggs, comminuted meats, fruits and vegetables, meat, fruit and vegetable juices, sauces, cooked cereals, soups, baby foods, puddings and gelatin desserts, coffee, tea, and the like. The term "fluid" as used herein includes liquids, emulsions, solutions containing either dissolved or suspended solid material, and comminuted solids which flow freely or can be scattered in a spray.

Milk, cream, and many other foods which contain protein, including eggs, egg whites, blood, and like foods containing albumin, are all sensitive to high temperatures, and the protein therein becomes insoluble if overheated. For example, milk protein is especially sensitive to heat while the solids concentration of the milk product is below about 87% by weight, and insolubilization of the protein occurs if the temperature of the milk rises to above about 70° C. before the product is dehydrated to this degree. This results in unpleasant taste and decreased ease and completeness of reconstitution. Theremore, during dehydration milk should be kept well below 70° C., preferably below about 35° C. Below this latter temperature, the protein and the fat content remain stable, and the resulting product is completely and rapidly reconstitutable in water and lacks the off taste associated with the commercial products presently available. The instant invention is also commercially feasible for the dehydration of fluid foodstuffs, such as coffee, citrus fruit juices and the like, which readily brown, scorch, and/or lose vitamins or flavor and aroma when heated.

The herein described methods and apparatus may be employed to dry materials in their normal state, and also those which have undergone a pre-drying treatment wherein a large amount of the moisture content of the material has been removed prior to delivery to the present apparatus. Depending upon the solids content of the feed material, the apparatus may include any number of vertically spaced zones wherein different heating intensities are introduced to the material so that moisture is driven off in each zone without rasing the temperature of the material in that zone so high as to damage it. Moreover, the instant vacuum apparatus is so designed that by the time the material reaches the bottom, it has cooled enough. Hence there is no need for further cooling with a cold air blast and the consequent risk of moisture absorption and oxidation.

My new procedures will now be illustrated in detail with reference to the drying of milk. However, it is to be understood that the general method is the same for dehydrating any desired fluid.

*Example I*

In the manufacture of powdered milk, the raw milk is usually pasteurized and condensed in a conventional manner, and the condensed milk is then dried in my improved dehydrating chamber. Condensation is not necessary; however, the milk is not damaged thereby and it is economical to concentrate the fresh milk to between about 35% and about 60% solids content before drying it in accordance with the instant invention. The condensed milk is most susceptible to heat damage while the solids content is below 87%; and therefore the radiant energy output in the upper zone is balanced against the evaporative cooling effect therein so that the milk droplets falling therethrough never attain a temperature higher than about 35° C. The energy may advantageously be supplied to the upper zone by a microwave generator.

After the solids content reaches 87%, the product is so resistant to heat damage that the temperature of the drying particles may be allowed to rise considerably. I have found that excellent dried milk may be obtained when the radiant energy output into the second zone is supplied by infra-red generators adjusted so that the drying particles do not attain an internal temperature higher than about 60° C. in the second zone. Substantial vacuum is maintained in both zones during the removal of moisture, the pressure being maintained as low as 5 mm. of mercury.

Generally no heat is supplied to the bottom zone 40 of the chamber. Hence the particles cool in vacuo before contact with each other, and while the last remnants of moisture are being evaporated from them and pumped out of the apparatus.

Milk products dehydrated in accordance with the instant invention show no evidence of heat damage, and are easier to reconstitute and possess a truer, more natural fresh flavor than previously known dried milk products.

*Example II*

The instant invention may be utilized to manufacture a new type of dried milk as follows:

Milk is dried as described in Example I, except that a hot concentrated aqueous solution of lactose is fed through inlet 51 to nozzles 52 which spray it in a fine mist into the lower region of zone 35 so as to coat each falling particle of the moist, sticky, nearly dried milk with a film of lactose solution. As each coated particle continues to fall, it continues to dry, until it becomes a particle of dry milk 53 encased in a coating of dry lactose 54 (see Figure 7). The lactose coating 54 protects the whole milk 53, and especially its milk fat content, against oxidative deterioration, to an appreciable degree. It also lubricates the particles of milk with a film of milk-sugar, so as to make the mass pour freely without undesirable agglomeration or caking—even after shelf storage for considerable periods. And since lactose wets more readily than whole milk powder, my new coated milk particles disperse and dissolve in water more rapidly and conveniently than is the case with conventional powdered milks.

Concentrated skim milk may be substituted for the lactose in the foregoing process, thereby producing particles of dried whole milk, or of fat-enriched dried milk, or of dried cream, enrobed in a coating of defatted milk solids, and having improved flowability, wettability, stability against oxidative deterioration, and resistance to caking.

My invention further includes particles of any of the dried products producible in my apparatus, coated with any protective materials known to the art and capable of being sprayed or dusted over the moist newly-formed particles of the primary substance being dried. Thus products such as coffee, gels, and the like, can be coated or dusted with defatted milk solids, starch, dextrin, lactose, sucrose, dextrose, and the like, to protect the coated particles.

The character of the instant invention is more fully illustrated by the following additional examples, wherein certain specific operating details are stated the better to teach the art, without in any way limiting the broad scope of my invention.

*Example III*

Fresh milk is pasteurized in the conventional manner at 61.7° C. for about 30 minutes, homogenized at 2500 pounds per square inch with a Manton-Gaulin single stage homogenizer, and condensed to 35% solids at 20° to 25° C. in a circulating evaporator. The condensed milk is then cooled to about 5° C. and is dried in the chamber of Figure 1 at a pressure of about 4.8 ± 2 mm. of Hg. The milk is introduced into the chamber through a nozzle having an orifice of 0.0122 inch diameter and operating under a hydraulic pressure of about 550 lbs. Using this size orifice, the particle size of the product is between about 42 and about 70 microns.

The energy for heating the falling particles is supplied by microwaves from magnetron tubes in the top vertical zone. Infra-red waves are used for heating in the lower zone.

The dried milk thus produced easily and rapidly wets and reconstitutes in water. Its taste compares very favorably with fresh milk. Its taste and solubility are superior to other commercially available spray dried whole milks. The product can be stored between 60 and 90 days at about 2° C. without noticeable deterioration.

Many foods made with milk or cream, such as soups, sauces, beverages and the like, can be dehydrated by substantially the same procedures as are described above.

*Example IV*

Fresh orange juice may be concentrated rapidly at low temperatures which do not produce cooked or other off-flavors, in the apparatus shown in Figure 1, by procedures similar to those described in Example I. The apparatus may be adjusted to discharge the commercially popular 5 to 1 concentrate. Or the dehydration may be made more intensive, so as to produce slurries, pastes, or even a sensibly dry powder. If desired, the individual particles of powdered orange juice may be coated with lactose, dextrose or the like, in the manner described with respect to powdered milk, to protect the orange content and to facilitate reconstitution of orange juice therefrom.

The other citrus fruits, such as graefruit, lime, and lemon can be concentrated or dried in the same manner as orange juice. Other fruit purees or juices such as prune juice, tomato juice, and grape juice; as well as soups, gravies, vegetable purees or juices, coffee, and the like, can be dehydrated by the instant procedure, which is specially indicated for concentrating or drying the heat-labile juices of many exotic fruits.

*Example V*

Whole eggs are broken out of the shell, homogenized, and dehydrated using the type of procedure and apparatus described in Example I. The pressure in the drying chamber is maintained below about 25 mm. of Hg, and the eggs are introduced through a nozzle operating under sufficient hydraulic pressure, say of the order of 500 lbs. The powdery dried egg is collected and removed from the bottom of the chamber.

In the above dehydration, the water is removed at a temperature so low that the albumin in the eggs remains in its original soluble form, and the product is easily and completely reconstitutable in water or milk. There is no off taste in the product.

Egg whites, cow, swine and human blood and blood sera, and the like, all can be dried using the same procedure, and the albumin and other proteins therein remain uncoagulated.

Having thus fully described and illustrated my invention, I claim:

1. The method of manufacturing a coated food particle which comprises spraying into a vacuum a foodstuff containing water, radiating dehydrating energy through said vacuum into the falling sprayed particles until they are sticky, spraying said sticky particles with an aqueous solution of edible coating matter, radiating additional dehydrating energy through said vacuum into the still falling coated particles to dry them, and removing the water vapor released into said vacuum.

2. A coated food particle comprising the product of the process of claim 1.

3. The method of claim 1 wherein the foodstuff is concentrated milk and the edible coating matter is lactose.

4. A process for dehydrating milk-containing substances, said process comprising the steps of causing particles of the substance to fall through a vacuum maintained at an absolute pressure of the order of about 5 mm. of Hg, radiating microwave energy shorter than about $10^{-4}$ cm. into the upper part of the path of said falling particles to evaporate water therefrom at substantially constant rate and temperature, said microwaves maintaining said particles at a temperature slightly below 35° C. until the particles attain a total solids content of about 87%, radiating infrared rays into the middle part of the path of the falling particles to substantially dry the particles without heat damage, said infrared rays entering the drying particles only after they have attained said total solids content of about 87% and then dehydrating said particles to a moisture content less than 5% while maintaining the temperature of the drying particles slightly below 60° C., allowing the dried particles to cool in the lower part of their path, and collecting the cool dry particles.

References Cited in the file of this patent

UNITED STATES PATENTS

| | | |
|---|---|---|
| 2,495,429 | Spencer | Jan. 24, 1950 |
| 2,585,970 | Shaw | Feb. 19, 1952 |
| 2,597,825 | Schroeder | May 20, 1952 |
| 2,708,636 | Rivoche | May 7, 1955 |
| 2,716,694 | Schroeder | Aug. 30, 1955 |

FOREIGN PATENTS

| | | |
|---|---|---|
| 631,395 | Great Britain | Nov. 2, 1949 |